United States Patent Office 3,475,397
Patented Oct. 28, 1969

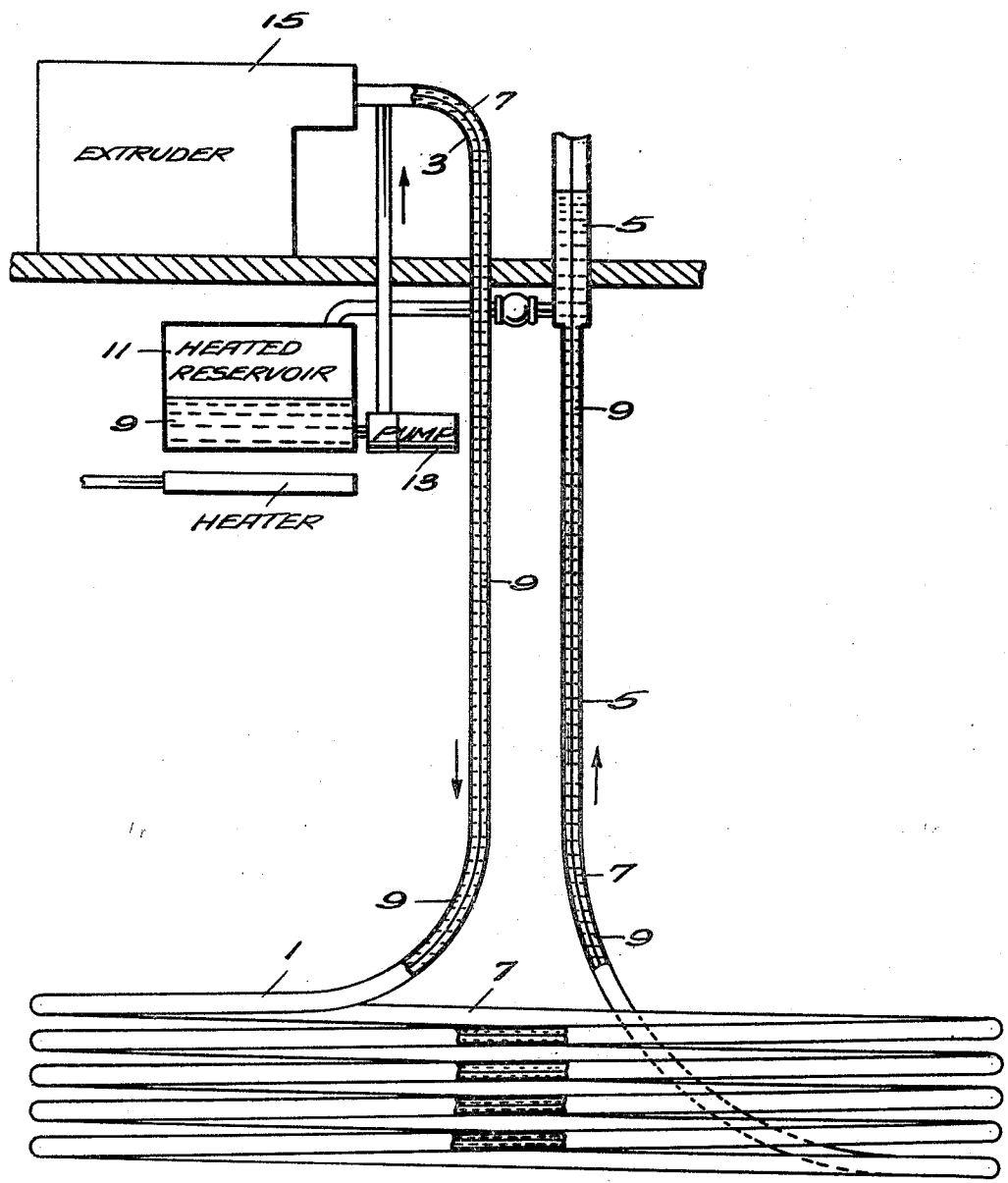

3,475,397
CONTINUOUS VULCANIZATION OF ELASTOMERIC MATERIALS
Melvin Albert Schoenbeck, Wilmington, Del., assignor to E. I. du Pont de Nemours and Company, Wilmington, Del., a corporation of Delaware
Filed Nov. 15, 1966, Ser. No. 594,605
Int. Cl. C08d 13/00; C08c 17/00
U.S. Cl. 260—92.3                            7 Claims

ABSTRACT OF THE DISCLOSURE

This invention relates to an improved method for continuously vulcanizing an extruded elastomeric composition which comprises extruding the elastomer into a tubular chamber filled with a liquid heat transfer medium maintained at a temperature sufficient to vulcanize the extrudate and flowing at a velocity sufficient to convey the extrudate through the chamber. The liquid heat transfer medium has the following properties: (1) It is substantially inert toward the extrudate, (2) it has a specific gravity approximately equal to the apparent specific gravity of the extrudate, and (3) it has a boiling point above the curing temperature required. The tubular chamber is preferably arranged in the form of a coil.

---

In the art of forming vulcanized, extruded products of plastic or elastomeric materials, such as tubing, hose, wire and cable coverings, solid and porous sealing gaskets, and the like, it is necessary to heat the extruded shape to effect the chemical crosslinking reactions that confer on the product its desirable properties. This was done in the older conventional art by heating the extruded shapes for relatively long periods in any of various styles of ovens or autoclaves. In the case of rubber hose, the extruded elastomer is sometimes encased in an extruded outer sheath of lead to act as a mold for the soft rubber stock. These slow and inefficient methods are gradually being supplanted by "continuous vulcanization," or CV processes, in which the extruded material is continuously passed through steam chambers, molten metal or salt baths, or through heated beds of fluidized granular solids. U.S. Patent 3,051,922 to Bradley discloses a process which employs a fluid bath of specific gravity substantially equal to that of the extrudate. The soft extrudate is supported by the fluid as it is drawn through the bath to prevent distortion of its shape before it is fixed by vulcanization. British Patent 1,025,202 to Sear discloses a process for urging the extrudate through a heating chamber as it is being vulcanized.

To date however, all of the CV processes have the disadvantage that installations long enough to provide exposure time adequate to bring the extrudate to an acceptable state of vulcanization at economical rates of extrusion require very large amounts of space. Heating chambers as long as 150 ft. or more are common. The expense of such installations is so great that the resulting high cost of vulcanized elastomers precludes their use in some applications where such elastomers give superior performance over other materials.

According to this invention an improvement is provided in the process of curing an extruded elastomer composition by conducting the extrudate through a zone containing a liquid heat transfer medium maintained at a temperature sufficient to cure said extrudate, said medium being substantially inert toward the extrudate, having a specific gravity substantially equal to the apparent specific gravity of the extrudate and a boiling point above the curing temperature required; which improvement comprises curing the extrudate in an elongated tubular chamber larger in its cross-sectional dimensions than the extrudate, said tubular chamber being filled with a liquid heat transfer medium flowing at a velocity sufficient to convey the extrudate through said chamber in the same direction as the flow of the liquid.

The invention will be better understood by reference to the drawing. FIGURE 1 is a diagrammatical view of one form of an apparatus suitable for use in practicing the process of this invention. Referring now to this drawing there is shown a tube 1 in the form of a coil having an inlet portion 3 and outlet portion 5 extending above the body of the coil. A vulcanizable elastomeric composition extruded in a predetermined configuration 7 is fed into the tube inlet from an extruder 15. A liquid heat exchange medium 9 which is heated in heated reservoir 11 completely fills that portion of the tube unoccupied by the extrudate and is continuously circulated through the system by means of pump 13. The extrudate is heated by the liquid medium 9 to a temperature sufficient to effect the degree of vulcanization desired as it is conveyed through the tube by the flowing action of the liquid. After the vulcanizate emerges from the tube at the outlet 5, it may be washed, further vulcanized if necessary or treated in other fashion prior to being wound up on a take-up reel or otherwise disposed of.

Extrudates suitable for vulcanization by the method of this invention include polymeric compositions of sorts that yield final products of flexible, rubber-like character; specifically natural rubber and synthetic elastomers such as styrene-butadiene rubber, polychloroprenes, polybutadienes, polyisoprenes, butyl rubber, acrylonitrile-butadiene rubber, polyolefin resins, chlorinated and sulfochlorinated polyolefins, and olefin copolymers such as the ethylene/propylene (EP) and ethylene/propylene/diene (EPDM) elastomers and the like. These polymers are compounded with vulcanizing agents, fillers, plasticizers, and so on by procedures well known to those skilled in the rubber arts.

The liquid heat transfer medium used in the method of this invention is substantially inert toward the extrudate. The liquid has a sufficiently high boiling point that no significant volatilization occurs at the vulcanizing temperature needed for the particular extrudate being processed, which will ordinarily be in the range of 120° C. to 300° C. and more usually in the range of about 140° C. to 250° C. High boiling organic fluids such as glycols, polyalkylene glycols, and mixtures thereof as well as water-glycol mixtures and solutions of inorganic salts in water are especially suitable and are readily available; although organic silicate esters and many other fluids can be used depending on the nature of the polymeric materials to be used. Representative examples are glycerol and esters thereof, polyethylene glycol, propylene glycol, ethylene glycol, diethylene glycol, tetra(2-ethyl butyl) silicate and tetra(2-ethyl hexyl) silicate. Glycerol is preferred, especially with polychloroprene extrudates because of its availability, high boiling point and desirable specific gravity. The specific gravity of the glycols may be increased when desired by dissolving therein controlled quantities of sodium tetraborate decahydrate.

The liquid heat transfer medium has approximately the same specific gravity as the apparent specific gravity of the extrudate. The particular liquid with a specific gravity to provide optimum operating conditions in a given circumstance may be determined by one skilled in the art following the guidelines set forth herein. In general, the specific gravity of the liquid medium is within the range of about 20% less to about 20% greater than the apparent specific gravity of the extrudate. It is found that higher liquid flow rates are needed to convey the extrudate as the differential in specific gravity increases. A preferred relationship is that the specific gravity of the liquid be no more than 10% greater or less than the apparent specific gravity of the extrudate. Within this range, the extrudate is carried smoothly through the tubular chamber with a minimum of drag.

It is emphasized that the specific gravity of the extrudate to be considered in determining the liquid to be used is its apparent specific gravity. The term apparent specific gravity represents the composite specific gravity of the extrudate, when the extrudate is in the form of a hose, gasket or other hollow article, and the liquid heat exchange medium with which the hollow extrudate is filled. When the extrudate is a solid article it contains no liquid of course, and the apparent specific gravity is the specific gravity of the extrudate alone.

In some instances, the apparent specific gravity of the extrudate will change during the vulcanization process as when a blowing agent is incorporated therein which expands when heated thus inflating the extrudate. When the density of the extrudate varies in this manner, a liquid medium is chosen which will maintain the ratio of the extrudate-liquid medium specfic gravities within the proper limits as set forth above. When a high degree of blowing is desired, such that the limitation in specific gravity differential would be exceeded, it is practical to effect a precure according to the method of this invention at a temperature too low to cause substantial evolution of gas by whatever blowing agent is employed in the stock being vulcanized, followed by a higher temperature post cure in a hot air oven, where the blowing agent decomposes to expand the extrudate to the desired cellular form and vulcanization is completed.

The fluid heat transfer medium is heated to the required temperature and is pumped through the tube of this invention by any conventional means known to those skilled in the art. The liquid medium fills the space in the tube unoccupied by the extrudate and where the extrudate is hollow it also fills the interior of the extrudate. Extrudate and fluid enter the tube, which may also be heated by an external bath or by steam or electrical heating means as required, and the liquid medium supports and heats the extrudate as its flowing action conveys it through the tube. The tube can be of whatever length is necessary to heat the extrudate for a long enough time to vulcanize the polymeric composition. The flowing action of the liquid provides the force needed to convey the extrudate through the tube. The extruder at the inlet and any take-up means at the outlet merely deliver the extrudate to and carry it from the tube.

The inside minimum cross-sectional dimension of the tube need be only slightly greater than the outside maximum cross-sectional dimension of the extrudate. It has been found however that passage of the extrudate through the tube is best facilitated by use of a tube having a minimum cross-sectional dimension at least about 30% greater than the greatest cross-sectional dimension of the extrudate. The tubing itself is composed of any material which can withstand the heat and pressure required to vulcanize the extrudate and maintain the liquid flow through the tube, and is sufficiently flexible to be arranged in the form of a coil. Conventional tubings such as copper, aluminum, steel and vulcanized elastomers, for instance "Nordel" hydrocarbon rubber, are representative examples.

The liquid medium velocity sufficient to convey the extrudate through the tube at practical rates can vary over a wide range depending on such factors as the relative specific gravities of the extrudate and liquid and the relative cross-sectional dimensions of the tube and extrudate. As noted previously, as the differential in the apparent specific gravity of the extrudate and the specific gravity of the liquid medium increases, the velocity of the liquid medium should also be increased. It has also been found that as the differential in the interior cross-sectional dimension of the tube and the maximum cross-sectional dimension of the extrudate decreases, the velocity of the liquid should be increased. The composition and physical properties of the extrudate should also be considered as a swiftly flowing liquid may tend to tear apart or otherwise damage a soft extruded composition. The optimum velocity at which the liquid should be circulated will vary depending on these factors but may be determined by one skilled in the art following the general guidelines set forth herein. Extrusions consisting of a typical polyolefin (EPDM) terpolymer elastomer in tubing type formulations of specific gravity 1.08 and 1.15 are successfully conveyed at rates of 22 to 62 feet per minute through a coiled tube of inside diameter 1.67 times the outside diameter of the extrudate by water (specific gravity 1.0) flowing at rates of 92 to 130 feet per minute.

An important advantage of this invention is that the heating tube can be arranged in a configuration that occupies a minium space, as in a coil. Thus, hundreds of feet of heating tube can be arranged to occupy only a few square feet of space, and in a preferred embodiment of this invention the heating tube is so arranged in a coiled tube configuration. It is not necessary that the tube be in the shape of a coil, but economy of space makes this arrangement preferred. The coil arrangement has the additional advantage that it can be arranged to introduce and remove extrudate at higher levels than the body of the coil, thus avoiding the problem of seals at the entrance and exit of the heating tube. Also, a hydraulic pressure head is thus provided that is necessary to prevent gas evolution in some types of vulcanizing elastomer compositions.

The practice of the invention is more specifically illustrated by the following example, in which parts are given by weight.

Example

The following composition is prepared by conventional mixing procedures in a laboratory size Banbury mixer:

| | |
|---|---|
| Polychloroprene[1] | 100 |
| Stearic acid | 1.5 |
| XLC magnesia | 2.0 |
| Phenyl α-naphthylamine | 2.0 |
| FEF carbon black | 60.0 |
| Aromatic petroleum oil ("Sundex" 790-Sun Oil Co.) | 25.0 |
| Di(2-ethylhexyl)sebacate | 5.0 |
| Calcium oxide (70%) in petroleum oil | 8.0 |
| Zinc oxide | 5.0 |
| 2-mercaptoimidazoline | 1.0 |

[1] A mixture of neoprene rubbers, WD, WB and WRT (60:20:20) commercially available from DuPont.

After softening on a warm-up mill, the composition, which has a specific gravity of 1.36, is extruded through a ¼ inch round die at 10 feet per minute into a heating tube consisting of 200 feet of 1 inch inside diameter reinforced steam hose made of "Nordel" hydrocarbon rubber, an EPDM type elastomer. The heating tube is in the form of a coil 10 feet in diameter.

The heating tube is filled with glycerol prior to introduction of the extrudate composition into the tube. The glycerol, which has a specific gravity of 1.26, is heated to 150° C. by electric immersion heaters in a small heating tank, and is circulated through the heating tube by a centrifugal pump at a flow rate of 100 feet per minute. The extrudate is carried through the heating tube by the circulating glycerol, and residence time of extrudate in the heating tube is 20 minutes. After passing through the heating tube, the vulcanized extrudate is washed by a water spray to remove any adhering glycerol and wound up on a take-up reel. It has a smooth, glossy surface, free from marring or distortion, and is tightly cured.

It will be obvious to those skilled in the art to make various modifications based on the general procedure of this invention. The heating tube can be disposed in any way convenient to the particular plant arrangement involved as long as passage of the extrudate through the tube is not restricted. By adding suitable sealing means the fluid can be introduced at elevated pressures where desirable. The process can be combined with other vulcanizing steps, such as oven curing, dielectric heating, and so on. It may be desirable to pass the extrudate through a quench bath after it leaves the heating tube. Such modifications and others can be made without departing from the basic discovery of this invention.

What is claimed is:

1. In a method for continuously curing an extruded vulcanizable elastomer composition by conducting said extrudate through a zone containing a liquid heat transfer medium maintained at a temperature sufficiently high to cause curing of said extrudate, having a specific gravity substantially equal to the apparent specific gravity of the extrudate, and having a boiling point above the curing said extrudate required; the improvement which comprises curing said extrudate in an elongated tubular chamber larger in its cross-sectional dimensions than the extrudate, said chamber being filled with a liquid heat transfer medium in which a pressure head is maintained and flowing at a velocity sufficient to convey the extrudate through said chamber, the length of said chamber being such that said vulcanizable elastomer composition resides in said chamber for a sufficient length of time to undergo vulcanization.

2. The process of claim 1 wherein the specific gravity of the liquid medium is within the range of about 20% less to about 20% greater than the apparent specific gravity of the extrudate.

3. The process of claim 2 wherein the specific gravity of the liquid medium is within the range of about 10% less to about 10% greater than the apparent specific gravity of the extrudate.

4. The process of claim 2 wherein the interior cross-sectional dimension of said tubular chamber is at least about 30% greater than the greatest cross-sectional dimension of said extrudate.

5. The process of claim 4 wherein the tubular chamber is arranged in the form of a coil.

6. The process of claim 5 wherein the extrudate is a polychloroprene and the liquid medium is glycerol.

7. The process of claim 1 wherein the curing temperature is maintained within the range of from about 120° C. to about 300° C.

References Cited

UNITED STATES PATENTS

| | | | |
|---|---|---|---|
| 2,361,717 | 10/1944 | Taylor | 260—78 |
| 3,051,992 | 9/1962 | Bradley. | |

FOREIGN PATENTS

| | | |
|---|---|---|
| 1,025,202 | 4/1966 | Great Britain. |
| 1,025,211 | 4/1966 | Great Britain. |

JOSEPH L. SCHOFER, Primary Examiner

W. F. HAMROCK, Assistant Examiner

U.S. Cl. X.R.

252—51.5; 260—29.6, 41, 45.9, 49.95, 827, 885, 896, 897

UNITED STATES PATENT OFFICE
CERTIFICATE OF CORRECTION

Patent No. 3,475,397                 October 28, 1969

Melvin Albert Schoenbeck

It is certified that error appears in the above identified patent and that said Letters Patent are hereby corrected as shown below:

Column 5, line 21, "said extrudate" should read -- temperature --.

Signed and sealed this 16th day of February 1971.

(SEAL)
Attest:

Edward M. Fletcher, Jr.
Attesting Officer

WILLIAM E. SCHUYLER, JR.
Commissioner of Patents